United States Patent [19]
Chini et al.

[11] Patent Number: 5,608,818
[45] Date of Patent: Mar. 4, 1997

[54] SYSTEM AND METHOD FOR ENABLING A ROBOTIC ARM TO GRIP AN OBJECT

[75] Inventors: Stefano Chini, San Lazzaro di Savena; Giuseppe Di Stefano, Ferrara; Armando Neri, Bologna, all of Italy

[73] Assignee: G.D Societa' Per Azioni, Bologna, Italy

[21] Appl. No.: 3,782

[22] Filed: Jan. 13, 1993

[30] Foreign Application Priority Data

Jan. 13, 1992 [IT] Italy .................. BO92A0008

[51] Int. Cl.$^6$ .................................. G06T 7/60
[52] U.S. Cl. .................. 382/153; 382/288; 382/291; 382/295; 348/95
[58] Field of Search ................ 382/8, 1, 45, 48, 382/23, 42, 26, 288, 291, 295, 153; 348/94, 95, 86; 364/516

[56] References Cited

U.S. PATENT DOCUMENTS

| | | | |
|---|---|---|---|
| 4,192,004 | 3/1980 | Buerger | 382/26 |
| 4,424,588 | 1/1984 | Satoh et al. | 382/48 |
| 4,707,647 | 11/1987 | Coldreu et al. | 382/28 |
| 4,727,471 | 2/1988 | Driels et al. | 382/8 |
| 4,803,735 | 2/1989 | Nishida et al. | 382/291 |
| 4,920,572 | 4/1990 | Sugita et al. | 382/48 |
| 4,955,064 | 9/1990 | Shirasaka et al. | 382/199 |
| 4,998,209 | 3/1991 | Vuichard et al. | 382/8 |
| 5,073,957 | 12/1991 | Seto et al. | 382/22 |

FOREIGN PATENT DOCUMENTS

| | | |
|---|---|---|
| 0020832 | 1/1981 | European Pat. Off. . |
| 0327069 | 8/1989 | European Pat. Off. . |
| 63-17735 | 1/1988 | Japan . |

OTHER PUBLICATIONS

Hitachi Review, vol. 36, No. 2, Apr. 1987, Tokyo, Japan. pp. 65–70, entitled "Development of the FIC Mounting Machine with Vision System" by M. Tsuji et al.

IEEE Proceedings of the Southeastcon '91, 1991, New York, US by B. S. Farroha et al., pp. 341–345 entitled "Problems in Robotic Vision".

Pp. 752–764 of IEEE Transactions on Robotics and Automation, vol. 5 No. 6, Dec. 1989, New York US by Grigore et al., entitled "Solving Jigsaw Puzzles by A Robot".

European Search Report and Annex.

Gonzalez et al. *Digital Image Processing*, Addison–Wesley Publishing, 1977.

Primary Examiner—Edward L. Coles, Sr.
Assistant Examiner—Jon Chang
Attorney, Agent, or Firm—Greenblum & Bernstein, P.L.C.

[57] ABSTRACT

A pickup system comprising a robot having a gripping member fitted with a camera for acquiring an image of the object to be picked up, which image is supplied to a control section by which it is processed for determining a predetermined point, typically the center, of the object by generating shifted inverted images of the object and intersecting the shifted inverted images and the original image.

16 Claims, 3 Drawing Sheets

SYSTEM AND METHOD FOR ENABLING A ROBOTIC ARM TO GRIP AN OBJECT

BACKGROUND OF THE INVENTION

The present invention relates to an automatic pickup system.

On production and packing plants employing reels of strip material, such as paper, plastic film, foil or similar, various sections of the plant must be supplied with reels of, at times, considerable weight and normally differing widely in size. For this purpose, movable robots are currently employed, for picking up the reels off loading stations (pallets), depositing them on to stands integral with the robot, and transferring them to the plant loading devices. For gripping the reel when transferring it from the loading station to the stand, and from the stand to the plant loader, the robots feature an articulated arm fitted on the end with a circular gripping member by which the reel is normally retained by means of a vacuum. Due to the widely differing inside and/or outside diameters of the reels employed on complex plants, the useful suction portion of the circular gripping member is in the form of a ring, the outside and inside diameters of which are respectively equal to the smallest outside diameter and largest inside diameter of the reels.

For the reel to be gripped properly by the articulated arm, the gripping member must be centered in relation to the type of reel being picked up, which, as the reel coordinates at the loading stations are seldom accurately known, and no provision is made for the assistance of an operator, necessarily involves providing the gripping member with an automatic centering system.

SUMMARY OF THE INVENTION

It is an object of the present invention to provide a rapid, reliable, fully automatic pickup system and method requiring no operator assistance.

According to the present invention, there is provided an automatic pickup system comprising a robot having an articulated arm with a gripping member for gripping an object, said articulated arm being controlled by a control section; characterized by the fact that said gripping member presents optical means for generating a detected image of at least one portion of said object, said detected image consisting of a number of dots; and by the fact that said control section comprises processing means for receiving said detected image and for determining the coordinates of predetermined points of the same.

The present invention also relates to an automatic pickup method.

According to the present invention, there is also provided a method of automatically picking up objects by means of a robot having an articulated arm fitted with a gripping member and controlled by a control section; characterized by the fact that it comprises stages wherein a detected image of at least one portion of said object is generated by optical means on said gripping member, said detected image consisting of a number of dots; and wherein the coordinates of predetermined points of said detected image are determined by said control section.

BRIEF DESCRIPTION OF THE DRAWINGS

A non-limiting embodiment of the present invention will be described by way of example with reference to the accompanying drawings, in which.

DETAILED DESCRIPTION OF TEE INVENTION

Figure 1:
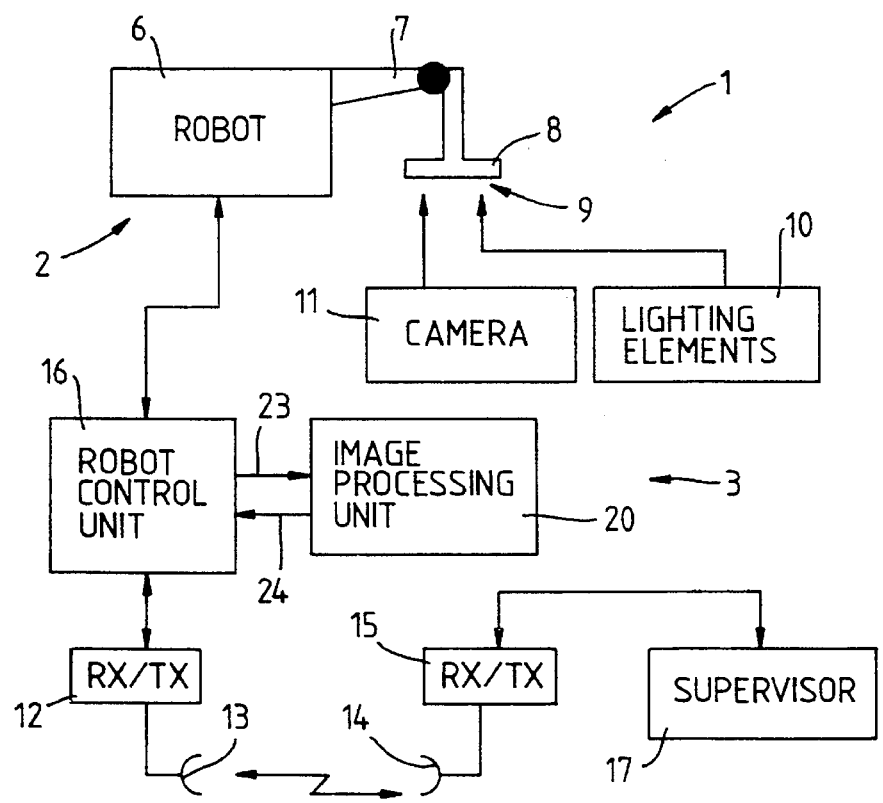
FIG. 1 shows a block diagram of a preferred embodiment of the pickup system according to the present invention.

Number 1 in FIG. 1 indicates an automatic pickup system in accordance with the present invention.

Figure 2:
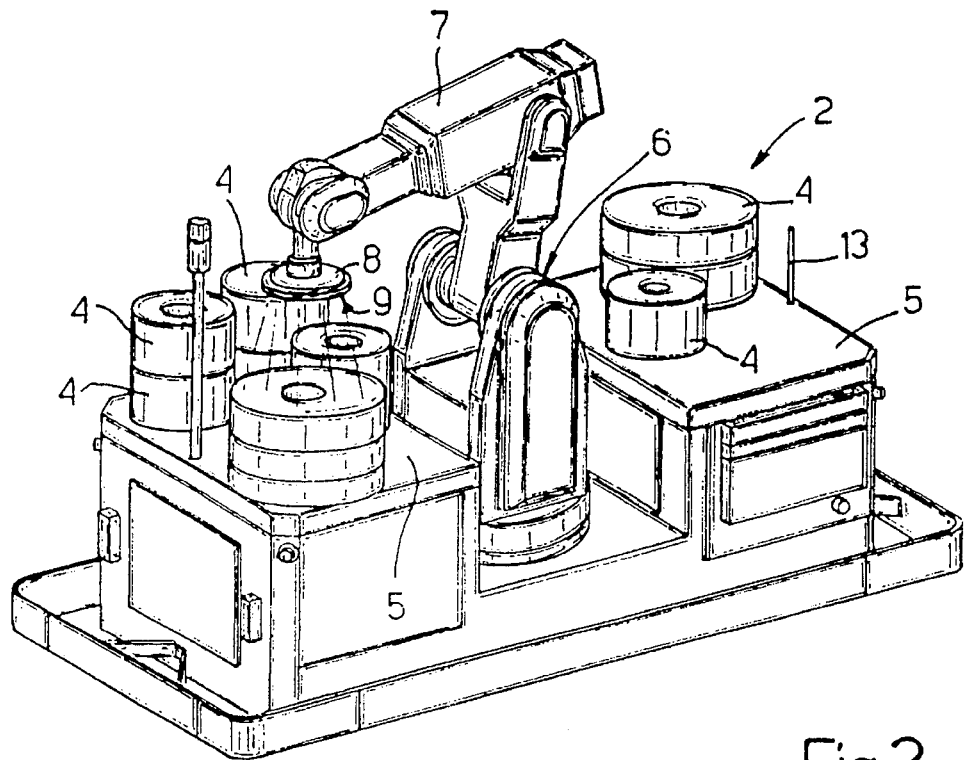
FIG. 2 shows a schematic view in perspective of a vehicle forming part of the automatic pickup system according to the present invention.

As shown in FIG. 1, system 1 comprises a vehicle 2 with a control unit 16 dialoging by radio with a plant supervisor 17. Vehicle 2, which is shown in more detail in FIG. 2, provides for picking up reels 4 at a loading station (not shown), depositing them on to one of stands 5 on vehicle 2, and subsequently picking them up off stand 5 and transferring them to a plant loader (not shown). For this purpose, vehicle 2 presents a robot 6 having an articulated arm 7 terminating with a circular gripping member 8, the reel gripping face 9 of which presents an annular portion (not shown) connected in known manner to a vacuum source (not shown) on vehicle 2. As shown schematically in FIG. 1, face 9 of gripping member 8 also presents lighting elements 10 and a camera 11, preferably housed in the center of face 9, inside the annular portion.

Vehicle 2 is fitted with a transmitter-receiver unit 12 connected to control unit 16 and which, via antennas 13 and 14 and a further transmitter-receiver unit 15, connects vehicle 2 to a plant supervisor 17 for supplying control unit 16 with operating instructions and the nominal coordinates of the reels to be picked up.

Control unit 16 positions robot arm 7 over the nominal coordinates of the center of reel 4 to be picked up, and is connected over lines 23 and 24 to an image processing unit 20 forming part of a control station 3 and which, over lines 23 and 24, respectively receives information relative to the type of reel, and sends back the real coordinates of the center of the reel corrected in relation to the nominal coordinates.

For accurately centering gripping member 8 in relation to the real coordinates of the center of reel 4, the system shown acquires an image of the central portion of the reel, including the axial hole of the reel, which appears dark in the image produced by the camera. The image is then sent to control section 3, and more specifically to processing unit 20 by which it is processed to determine the real coordinates of the center of reel 4, which coordinates are then employed by numerical control unit 16 for accordingly controlling operation of arm 7.

The manner in which the image is processed by unit 20 will be described with reference to FIG. 3 and FIGS. 4 to 16 showing the images resulting from processing the dot matrix constituting the image produced by the camera. In connection with the above, it should be pointed out that, for reasons of clarity, the images referred to in the following description are those which would be produced in a display of the dot matrix resulting from processing the camera image, even though said images may not actually be displayed.

Figure 3:
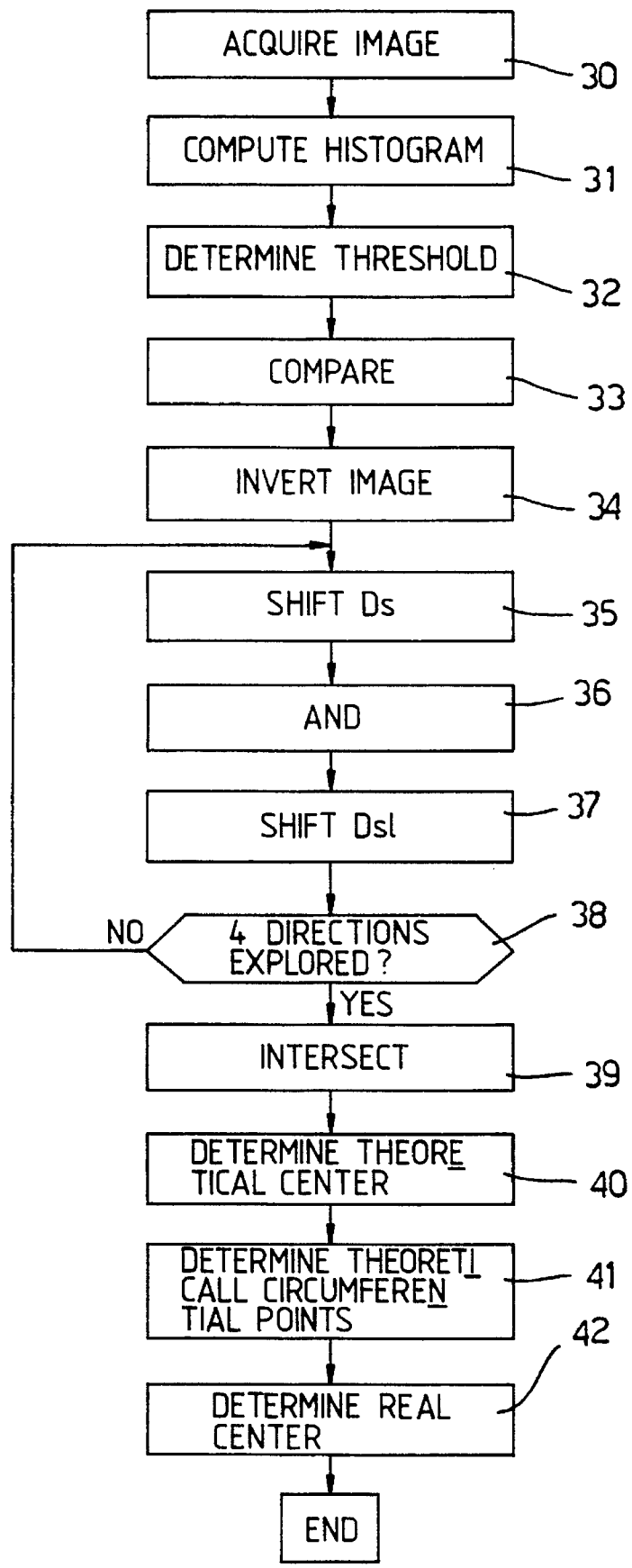
FIG. 3 shows a flow chart of a preferred embodiment of the automatic pickup method according to the present invention.

As shown in FIG. 3, to begin with (block 30), unit 20 acquires the image produced by the camera and consisting of a number of dots, each characterized by a discrete value proportional to the luminance of the dot in the portion viewed by the camera and consisting of a whole number ranging between a maximum value (e.g. 255) and a minimum value (usually 0) corresponding, for example, to "white" and "black" levels. Block 31 then computes a histogram of the image dot values, wherein each discrete value is related to the number of dots at that value; and, on the basis of said histogram, block 32 determines a threshold value for discriminating between the very or fairly light dots definitely not forming part of the axial hole of the reel, and the dark dots which could form part of the axial hole.

Figure 4:
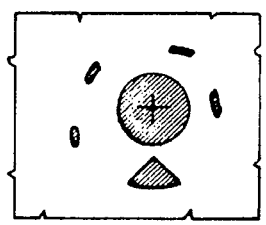
FIGS. 4 to 16 show the various stages in determining the center of an object according to the FIG. 3 method.

Block 33 then compares the dots in the image produced by camera 11 with the threshold determined in block 32, and each dot is assigned a binary or logic value depending on whether it is above or below the threshold. For example, the dots whose luminosity (i.e. discrete value) is above the threshold are assigned a "0" logic value, while the dark dots are assigned a "1". These logic values are then memorized in a storage device (not shown), such as a memory array. The image resulting from such processing, and hereinafter referred to for the sake of simplicity as the reference image, is as shown in FIG.4, wherein the logic "0" and "1" dots are respectively white and black. The image in the FIG. 4 example presents a dark main portion corresponding to the axial hole of the reel, and a number of dark noise portions due, for example, to imperfect flatness of the side of the reel or other factors, so that certain portions of the reel appear darker than others. The image also includes other elements extraneous to the reel (such as portions of the supporting pallet).

Figure 5:
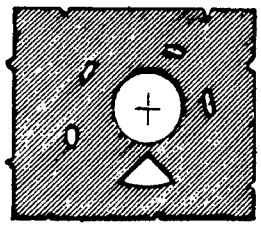
Figure 6:
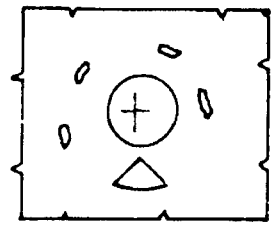
Figure 7:
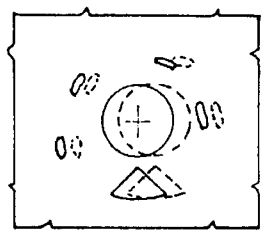
Figure 8:
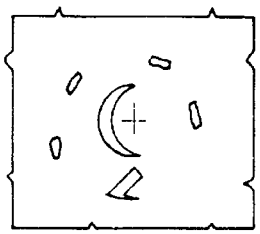

Block 34 then generates an inverted image consisting of dots with a negated or inverted logic value as compared with the reference image dots, so as to produce the negative image shown in FIG. 5. In block 35, the inverted image is shifted in a first direction, e.g. to the right, by a given distance Ds expressed in pixels and as shown in FIG. 6, wherein only the outline of the light portions on the dark background are shown for the sake of simplicity. Block 36 then performs an AND operation of the reference image dots (FIG. 4) and the corresponding dots in the inverted, shifted image (FIG. 6), which operation provides for generating a new image or matrix, the dots of which only present a logic "1" value when the corresponding dots in both the reference image and the inverted, shifted image also present a logic "1" value, i.e. are both black in the case in question. To make this clearer, observe FIG. 7, wherein the continuous outlines indicate the black dot portions (on the white background) in the FIG. 4 reference image, and the dotted outlines the white dot portions (on the black background) in the inverted, shifted image in FIG. 6, and compare this with FIG. 8 showing the outlines of the logic "1" (black) dot portions resulting from the above AND operation.

Figure 9:
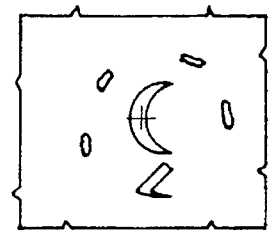

In block 37, the dots in the image so formed (FIG. 8) are shifted in the same direction as before, but by a distance Ds1 equal to the known radius of the axial hole of reel 4 minus half distance Ds, to give a dot matrix corresponding to the image shown in FIG. 9 and hereinafter also referred to as the intersection image.

Figure 10:
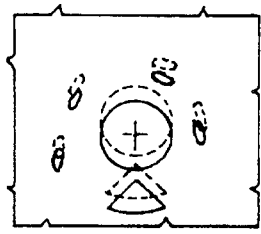
Figure 11:
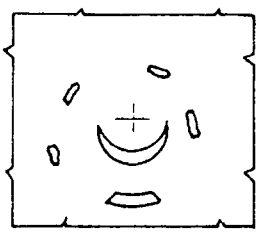
Figure 12:
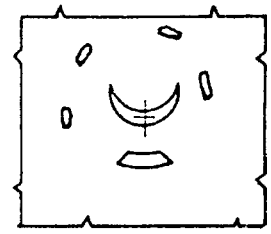

The operations performed in blocks 35, 36 and 37 are repeated three times more, each time shifting the negative image (FIG. 5) in a different direction and by the same distance Ds, and then shifting the respective intersection image in the same direction as before but by distance Ds1. The above stages relative to the case in question are illustrated in FIGS. 10 to 14. FIG. 10 shows the image resulting from overlapping the reference image and that produced by shifting the negative image upwards by distance Ds. More specifically, the continuous outlines indicate the black dot portions (on the white background) in the reference image, and the dotted outlines the white dot portions (on the black background) in the inverted, up-shifted image. The AND operation produces a dot matrix corresponding to the image (intersection image) shown in FIG.11, which shows the outlines of the black dot portions on the white background. FIG. 12 shows the image resulting from shifting the FIG. 11 image upwards by distance Ds1.

Figure 13:
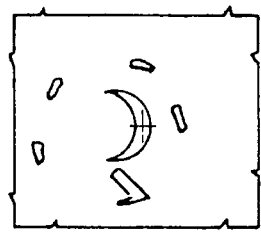
Figure 14:
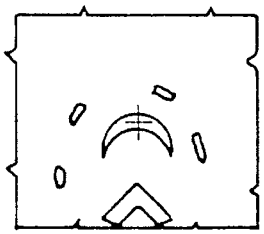

Similarly, FIG. 13 shows the intersection image produced by the dot matrix by shifting the FIG. 5 inverted image leftwards by distance Ds, performing an AND operation of said shifted inverted image and the FIG. 4 reference image, and shifting the resulting image leftwards by distance Ds1. In the same way, FIG. 14 shows the intersection image resulting from a downward shift.

Figure 15:
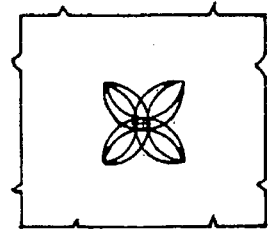
Figure 16:
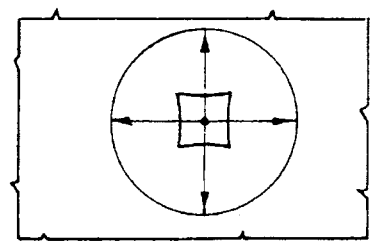

Following the above operations (YES output of block 38 in FIG. 3), the method according to the present invention provides, in block 39 in FIG. 3, for intersecting the four intersection images (FIGS. 9, 12, 13 and 14) as shown in FIG. 15, which shows the outlines of the logic "1" dot portions of the four intersection images. For the sake of simplicity, the dark "noise" portions are omitted in FIG. 15, by virtue of failing to overlap in the above four-directional shift and so being eliminated in the intersection operation.

The resulting intersection (again effected by performing an AND operation of the logic values of the dots in the four intersection images) produces a small central square or other small irregular figure inside which the actual center of the reel lies. According to the present method, the coordinates of the center of the square are then determined in block 40 to give the coordinates of the theoretical center of the reel; and, for further increasing precision, block 41 provides for determining, in the reference image, two pairs of points on the circumference of the dark portion in which the square lies, and along two perpendicular lines through the theoretical center determined previously. By virtue of the symmetry of said circumference, the two mid points of said two pairs of points provide a further estimate of the reel center (block 42).

This completes determination of the reel center coordinates, which are then supplied by processing unit 20 over line 24 to numerical control unit 16, which in turn provides for further controlling articulated arm 7 so as to center gripping member 8 in relation to reel 4, and then lower the gripping member on to the reel in known manner.

Gripping member 8 is therefore centered perfectly at all times in relation to reel 4, regardless of lighting conditions or any noise present in the detected image, thus enabling rapid, fully automatic transfer of reels 4 from the pickup station (pallet) to stands 5, with no operator assistance required. It should be pointed out that the same method may also be employed for detecting the center of objects of different, albeit regular, shapes, e.g. square objects, or for determining the coordinates of particular predetermined points, by appropriately selecting the amount of shift to be effected.

We claim:

1. An automatic pickup system of a robot having an articulated arm with a gripping member for gripping an object, comprising:

a control system that controls operations of said articulated arm;

an optical system that generates an image of at least one portion of said object, said image being composed of a plurality of pixels; and a processing system that determines a true center of said object by coining said generated image with an inverted image of said generated image that is shifted in one of a plurality of directions by a predetermined amount relative to said generated image to produce a new image, said inverted image of said generated image being successively shifted a plurality of times in different directions to produce a plurality of new images, said generated image being combined with said shifted inverted image by an AND operation that is performed after each shift of said inverted image, each new image being shifted by a predetermined amount related to a known radius of an aperture in said object, said plurality of new images being intersected together by an AND operation to produce a central square, coordinates of a center of said central square representing said true center of said object, so as to enable said robot to locate and grip said object using said articulated arm.

2. The system of claim 1, further comprising a digitizer that digitizes said generated image.

3. The system of claim 2, wherein said processing system determines pixels common to said plurality of new images and said generated image.

4. The system of claim 2, wherein each pixel of said plurality of pixels has a discrete value proportional to a luminance of said each pixel in said at least one portion, said discrete value ranging between a minimum value and a maximum value, said processing system comprising means for comparing said discrete value of each pixel with a threshold value, and for generating a reference matrix, said reference matrix comprising a number of pixels having a logic binary value.

5. The system of claim 4, wherein said comparing means comprises means for determining relative frequencies of said discrete values of said pixels, and means for generating threshold value on the basis of said relative frequencies.

6. The system of claim 4, wherein said processing system further comprises an inverter that generates an inverted matrix, in which associated pixels have an inverted binary value as compared with corresponding pixels in said reference matrix.

7. The system of claim 6, wherein said processing system further comprises a first shifter that generates a plurality of first shifted matrices by effecting first shifts of said pixels associated with said inverted matrix, said first shifted matrices being shifted in said plurality of directions.

8. A method for automatically picking up an object using a robot having an articulated arm fitted with a gripping member, the robot being controlled by a control section, comprising the steps of:

producing an image of at least one portion of the object with an optical system associated with the gripping member, the image being formed by a plurality of pixels; and determining a true center of the image by combining the produced image with an inverted image of the produced image that is shifted by a predetermined amount in one of a plurality of directions relative to the produced image, the inverted image of the produced image being successively shifted a plurality of times in different directions to create a plurality of new images, the produced image being combined with the shifted inverted image by an AND operation that is performed after each shift of the inverted image, each new image being shifted by a predetermined amount related to a known radius of an aperture in said object, the plurality of new images being intersected together by an AND operation to obtain a central square, coordinates of a center of the central square representing the true center of the object, so as to enable the robot to locate and grip the object using the articulated arm.

9. The method of claim 8, further comprising the step of digitizing the produced image.

10. The method of claim 9, wherein the determining step comprises shifting the inverted image by a number of pixels in relation to the plurality of pixels of the digitized image to enable a determination of common points.

11. The method of claim 9, wherein each pixel of the plurality of pixels forming the digitized image has a discrete value proportional to a luminance of each pixel in the at least one portion of the object, the discrete value ranging between a minimum value and a maximum value, the determining step comprising the step of comparing the discrete value of each pixel with a threshold value, and generating a reference matrix having a number of associated pixels having a logic binary value.

12. The method of claim 11, further comprising the step of determining relative frequencies of the discrete value, the threshold value being generated on the basis of the relative frequencies.

13. The method of claim 11, further comprising the step of generating an inverted matrix, the inverted matrix having a number of pixels with an inverted binary value as compared with corresponding pixels in the reference matrix.

14. The method of claim 13, further comprising the step of generating a number of first shifted matrices by effecting first shifts in different directions with respect to the pixels in the inverted matrix.

15. A method for automatically picking up an object using a robot having an articulated arm fitted with a gripping member, the robot being controlled by a control section, comprising the steps of:

(a) acquiring an image of the object and producing a plurality of pixel values corresponding to a luminance of respective pixels forming the image;

(b) determining a threshold value to discriminate the plurality of pixels;

(c) comparing the plurality of pixels with the threshold value to assign values representing whether each of the plurality of pixels is above or below the threshold value;

(d) creating an inverted image of the acquired image;

(e) shifting the inverted image in a direction with respect to the acquired image by a first predetermined distance;

(f) AND'ing the acquired image and the shifted inverted image to create a summed image representing areas where an overlap of the acquired image and the successively shifted inverted image are canceled;

(g) shifting the summed image by a predetermined amount related to a known radius in the object;

(h) repeating steps (e) through (g) a plurality of times, each shifting being successively performed in a direction that differs from a previous direction to create a plurality of summed images;

(i) AND'ing the plurality of summed images to produce a central square in which coordinates of a center of the central square determine a true center of the object; and (j) controlling an operation of the robot in accordance with the determined true center of the object so as to enable the robot to locate and grip the object using the articulated arm.

16. The method of claim 15, wherein the object comprises a reel of strip material.

* * * * *